(12) United States Patent
Shilston et al.

(10) Patent No.: US 8,040,428 B2
(45) Date of Patent: Oct. 18, 2011

(54) METHOD FOR FOCUS CONTROL

(75) Inventors: Robert T Shilston, Ipswich (GB);
Frederick W M Stentiford, Woodbridge (GB)

(73) Assignee: British Telecommunications public limited company, London (GB)

( * ) Notice: Subject to any disclaimer, the term of this patent is extended or adjusted under 35 U.S.C. 154(b) by 366 days.

(21) Appl. No.: 12/085,775

(22) PCT Filed: Dec. 8, 2006

(86) PCT No.: PCT/GB2006/004602
§ 371 (c)(1),
(2), (4) Date: May 30, 2008

(87) PCT Pub. No.: WO2007/071918
PCT Pub. Date: Jun. 28, 2007

(65) Prior Publication Data
US 2009/0310011 A1 Dec. 17, 2009

(30) Foreign Application Priority Data
Dec. 19, 2005 (EP) .................................... 05257796

(51) Int. Cl.
*H04N 5/232* (2006.01)
*H04N 5/222* (2006.01)
*G06K 9/40* (2006.01)
*G06K 9/46* (2006.01)

(52) U.S. Cl. ................... 348/345; 348/333.05; 348/346; 348/348; 348/349; 382/263; 382/205; 382/254; 382/274

(58) Field of Classification Search .......... 348/362–370, 348/345–346, 348–349, 351, 354, 333.01–333.03, 348/355–356, 333.05, 254; 382/263, 264, 382/254, 274, 275, 205, 209, 181
See application file for complete search history.

(56) References Cited

U.S. PATENT DOCUMENTS
4,646,352 A    2/1987   Asai et al.
(Continued)

FOREIGN PATENT DOCUMENTS
EP         0098152        1/1984
(Continued)

OTHER PUBLICATIONS

Zhao D., Shridhar M., Daut D.G., "Morphology on Detection of Calcifications in Mammograms," Digital Signal Processing 2, Estimation, VLSI, San Francisco, Mar. 23-26, 1992, Proceedings of the International Conference on Acoustics, Speech and Signal Processing (ICASSP), New York, IEEE, US-ISBN 0-7803-0532-9, vol. 5 Conf. 17, pp. 129-132.

(Continued)

*Primary Examiner* — Lin Ye
*Assistant Examiner* — Marly Camargo
(74) *Attorney, Agent, or Firm* — Nixon & Vanderhye P.C.

(57) ABSTRACT

A camera or other optical system is focused by generating a plurality of digital images each obtained with a different focus setting of the optical system. These images are analysed to generate for each image a score (S) by comparing first groups of pixels chosen from the image with second groups chosen from the image such that the pixels of each second group have same respective positional relationships with respect to one another as the pixels of the first group with which it is compared have to one another, the score (S) being a function of the number of matches obtained with said comparisons. The focus setting that gives the score corresponding to the largest number of matches is chosen.

2 Claims, 3 Drawing Sheets

U.S. PATENT DOCUMENTS

| | | | |
|---|---|---|---|
| 5,113,454 A | 5/1992 | Marcantonio et al. | |
| 5,200,820 A | 4/1993 | Gharavi | |
| 5,303,885 A | 4/1994 | Wade | |
| 5,703,968 A | 12/1997 | Kuwahara et al. | |
| 5,790,413 A | 8/1998 | Bartusiak et al. | |
| 5,825,016 A | 10/1998 | Nagahata et al. | |
| 5,867,813 A | 2/1999 | Di Pietro et al. | |
| 5,978,027 A | 11/1999 | Takeda | |
| 6,091,844 A | 7/2000 | Fujii et al. | |
| 6,094,507 A | 7/2000 | Monden | |
| 6,111,984 A | 8/2000 | Fukasawa | |
| 6,240,208 B1 | 5/2001 | Garakani et al. | |
| 6,260,059 B1 | 7/2001 | Ueno et al. | |
| 6,266,676 B1 | 7/2001 | Yoshimura et al. | |
| 6,282,317 B1 | 8/2001 | Luo et al. | |
| 6,304,298 B1 | 10/2001 | Steinberg et al. | |
| 6,389,417 B1 | 5/2002 | Shin et al. | |
| 6,480,629 B1 | 11/2002 | Bakhmutsky | |
| 6,483,937 B1 | 11/2002 | Samuels | |
| 6,499,009 B1 | 12/2002 | Lundberg et al. | |
| 6,590,937 B1 | 7/2003 | Ogura et al. | |
| 6,778,699 B1 | 8/2004 | Gallagher | |
| 6,934,415 B2 * | 8/2005 | Stentiford | 382/205 |
| 6,996,291 B2 | 2/2006 | Nahum | |
| 7,142,689 B2 | 11/2006 | Hayashi et al. | |
| 7,546,236 B2 * | 6/2009 | Stentiford | 704/201 |
| 7,620,249 B2 * | 11/2009 | Stentiford | 382/218 |
| 2001/0013895 A1 | 8/2001 | Aizawa et al. | |
| 2001/0030759 A1 | 10/2001 | Hayashi et al. | |
| 2002/0081033 A1 | 6/2002 | Stentiford | |
| 2002/0126891 A1 | 9/2002 | Osberger | |
| 2002/0168117 A1 | 11/2002 | Lee et al. | |
| 2004/0130733 A1 * | 7/2004 | Morita et al. | 358/1.2 |
| 2005/0031178 A1 | 2/2005 | Park | |
| 2005/0074806 A1 | 4/2005 | Skierczynski et al. | |
| 2005/0143976 A1 | 6/2005 | Stentiford | |
| 2005/0169535 A1 | 8/2005 | Stentiford | |
| 2006/0050993 A1 | 3/2006 | Stentiford | |
| 2007/0116354 A1 | 5/2007 | Stentiford | |
| 2008/0075372 A1 | 3/2008 | Stentiford | |

FOREIGN PATENT DOCUMENTS

| | | | |
|---|---|---|---|
| EP | 1126411 | | 8/2001 |
| EP | 1 286 539 | | 2/2003 |
| EP | 1 286 539 | A1 | 2/2003 |
| EP | 1286539 | | 2/2003 |
| EP | 1 533 996 | | 5/2005 |
| EP | 1 533 996 | A1 | 5/2005 |
| GB | 1417721 | | 12/1975 |
| GB | EP1286539 | A1 * | 2/2003 |
| JP | 03-238533 | | 10/1991 |
| JP | 03-238566 | | 10/1991 |
| JP | 06-245064 | | 9/1994 |
| JP | 07-027537 | | 1/1995 |
| JP | 10-260773 | | 9/1998 |
| JP | 2000-207420 | | 7/2000 |
| JP | 2000-512790 | | 9/2000 |
| JP | 02-50066 | | 2/2002 |
| JP | 2003-187217 | | 7/2003 |
| WO | 82/01434 | | 4/1982 |
| WO | 90/03012 | | 3/1990 |
| WO | 99/05639 | | 2/1992 |
| WO | 98/47061 | | 10/1998 |
| WO | 99/60517 | | 11/1999 |
| WO | 00/33569 | | 6/2000 |
| WO | 01/31638 | | 5/2001 |
| WO | 01/61648 | | 8/2001 |
| WO | 02/21446 | | 3/2002 |
| WO | 02/098137 | A1 | 12/2002 |
| WO | 03/081523 | | 10/2003 |
| WO | 03/081577 | | 10/2003 |
| WO | 2004/042645 | | 5/2004 |
| WO | 2004/057493 | | 6/2004 |
| WO | 2005/057490 | | 6/2005 |
| WO | 2006/030173 | | 3/2006 |
| WO | 2006/131701 | | 12/2006 |
| WO | 2007/012798 | | 2/2007 |
| WO | 2007/071918 | | 6/2007 |

OTHER PUBLICATIONS

Brown L.G., A survey of image registration techniques, ACM Computing Surveys, vol. 24, No. 4 (Dec. 1992), pp. 325-376.

Lutton, E., Maitre H., and Lopez-Krahe, J., "Contribution to the determination of vanishing points using Hough transform," IEEE Trans. on Pattern Analysis and Machine Intelligence vol. 16, No. 4, pp. 430-438, (Apr. 1994).

Santini S. & Jain R., "Similarity Matching," Proc $2^{nd}$ Asian Conf. on Computer Vision, pp. II 544-548, IEEE, 1995.

McLean, G.F., and Kotturi, D., "Vanishing point detection by line clustering," IEEE Trans. on Pattern Analysis and Machine Intelligence, vol. 17 No. 11, pp. 1090-1095, Nov. 1995.

Guoyou Wang et al., "Efficient method for multistate small target detection from a natural scene," Optical Engineering, Soc. of Photo-Optical Instrumentation Engineers, Bellingham, US—ISSN 0091-3286, vol. 35, No. 3 (Mar. 1, 1996), pp. 761-768.

Koizumi T., Chun H-S, Zen H., "A new optical detector for a high-speed AF control", IEEE Transactions on Consumer Electronics, IEEE Inc., New York, US—ISSN 0098-3063, vol. 42, Nr. 4 (Nov. 1996), pp. 1055-1061.

Young Rui, Huang T.S., Mehrota S., Ortega M., "A relevance feedback architecture for content-based multimedia information retrieval systems," Proceedings IEEE Workshop on Content-Based Access of Image an dVideo Libraries, 1997 San Juan, Puerto Rico Jun. 20, 1997, Los Alamitos, CA, USA, IEEE Comput. Soc., US-ISBN 0-8186-7981-6, pp. 82-89.

Rohwer R., Morciniec M., "The Theoretical and Experimental Status of the n-tuple Classifier," Neural Networks, Elsevier Science Publishers, Barking, BG-ISSN 0893-6080, vol. 11, No. 1 (Jan. 1998), pp. 1-14.

Walker et al., "Locating salient facial features using image invariants," Proc. $3^{rd}$ IEEE International Conference on Automatic Face and Gesture recognition, 1998, pp. 242-247.

Mahlmeister et al., "Sample-guided progressive image coding," Proc. Fourteenth Int. Conference on Pattern Recognition, Aug. 16-20, 1998, pp. 1257-1259, vol. 2.

Osberger, W. and Maeder, A.J., "Automatic Identification of perceptually important regions in an image," Proc. Fourteenth Int. Conference on Pattern Recognition, Aug. 16-20, 1998, pp. 701-704 vol. 1.

Buhmann, J.M., "Dithered Colour Quantisation," Eurographijics 98, Sep. 1998 http://opus.tu-bs.de/opus/volltexte/2004/593/pdf/TR-tubs-cg-1998-01.pdf.

Rui Y. et al., "Relevance feedback: a power tool for interactive content-based image retrieval," IEEE Transactions on Circuits and Systems for Video Technology, IEEE Inc., New York, US-ISSN 1051-8215, vol. 8, Nr. 5 (Sep. 1, 1998), pp. 644-655.

M.E.J. Wood, N.W. Campbell and B.T. Thomas, "Iterative Refinement by Relevance Feedback in Content-Based Digital Image Retrieval," Proceedings of the Sixth ACM International Conference on Multimdedia Sep. 12, 1998, pp. 13-20.

Gallet O., Gaussier P., Cocquerez J-P, "A model of the visual attention to speed up image analysis," Proceedings of the 1998 IEEE International Conference on Image Processing (ICIP-98), Chicago, Illinois, Oct. 4-7, 1998, IEEE Computer Society, 1998, ISBN 0-8186-8821-1, vol. 1, pp. 246-250.

Itti, J., Kock, C. and Niebur, E., "A model of saliency-based visual attention for rapid scene analysis," IEEE Trans. on Pattern Analysis and Machine Intelligence, vol. 20, No. 11, pp. 1254-1259, Nov. 1998.

Shufelt, J.A., "Performance evaluation and analysis of vanishing point detection techniques," IEEE Trans. on Pattern Analysis and Machine Intelligence, vol. 21, No. 3, pp. 282-288, 1999.

K. Curtis, P.W. Foster and F.W.M. Stentiford, "Metadata—the key to content management services," $3^{rd}$ IEEE Metadata Conference, Apr. 6-7, 1999.

F.W.M. Stentiford, "Evolution: the best possible search algorithm?" BT Technology Journal, vol. 18, No. 1, Jan. 2000 (Movie version).

Wixson L., "Detecting Salient Motion by Accumulating Directionally-Consistent Flow," IEEE Transactions on Pattern Analysis and Machine Intelligence, IEEE Inc., New York, US—ISSN 0162-8828, vol. 22, No. 8 (Aug. 2000), pp. 774-780.

Rother, C., "A new approach for vanishing point detection in architectural environments," 11th British Machine Vision Conference, Bristol, UK, Sep. 2000. http://www.bmva.ac.uk/bmvc/2000/papers/p39.pdf.

Privitera et al., "Algorithms for defining visual regions-of-interest: comparison with eye fixation," IEEE Trans. on Pattern Analysis and Machine Intelligence, vol. 22, No. 9 (Sep. 2000), pp. 970-982.

Zhao, W. et al., "Face recognition: A Literature Survey," CVLK Technical Report, University of Maryland, Oct. 2000. ftp://ftp.cfar.umd.edu/TRs/CVL-Reports-2000/TR4167-zhao.ps.gz.

Raeth P.G. et al., "Finding Events Automatically in Continuously Sampled Dta Streams via Anomaly Detection," Proceedings of the IEEE 2000 national Aerospace and Electronics Conference. NAECON, Oct. 10-12, 2000. pp. 580-587.

Smeulders, A.W.M., Worring, M.; Santini,S; Gupta, A; Jain, R.: "Content-based image retrieval at the end of the early years," IEEE Transactions on Pattern Analysis and Machine Intelligence, IEEE Inc., New York, US-ISSN 0162-8828, vol. 22, Nr. 12 (Dec. 2000), pp. 1349-1380.

Sebastian, T.B. et al., "Recognition of Shapes by Editing Shock Graphs," Proc. ICCV 2001, pp. 755-762.

Vailaya, A. et al., "Image Classification for Content-Based Indexing," IEEE Trans on Image Processing, vol. 10, No. 1, pp. 117-130, Jan. 2001.

L-Q, Xu, J. Zhu, and F.W.M. Stentiford, "Video summarization and semantic editing tools," in Storage and Retrieval for Media Databases, Proc SPIE vol. 4315, San Jose, Jan. 21-26, 2001.

Stentiford, F.W.M., "An estimator for visual attention through competitive novelty with application to image compression," Picture Coding Symposium, Seoul, pp. 101-104, 2001 http://www.ee.ucl.ac.uk/~fstentif/PCS2001.pdf.

F.W.M. Stentiford, "An evolutionary programming approach to the simulation of visual attention," Congress on Evolutionary Computation, Seoul, May 27-30, 2001 pp. 851-858.

Cantoni, V., Lombardi, L., Porta, M., and Sicard, N., "Vanishing point detection: representation analysis and new approaches," 11th Int. Conf. on Image Analysis and Processing, Palermo, Italy Sep. 26-28, 2001.

Ouerhani et al., "Adaptive colour image compression based on visual attention," Proc. 11th Int. Conference on Image Analysis and Processing, Sep. 26-28, 2001, pp. 416-421.

M. Russ, I. Kegel and F.W.M. Stentiford, "Smart Realisation: delivering content smartly," J. Inst. BT Engineers, vol. 2, Part 4, pp. 12-17, Oct.-Dec. 2001.

F.W.M. Stentiford, N. Morley, and A. Curnow, "Automatic Identification of Regions of Interest with Application to the Quantification of DNA damage in Cells," in Human Vision and Electronic Imaging, VII, B. E. Rogowitz, T.N. Pappas, Editors, Proc SPIE Vl. 4662, pp. 244-253, San Jose, Jan. 20-26, 2002.

A. P. Bradley and F.W.M. Stentiford, "JPEG 2000 and region of interest coding," Digital Imaging Computing—Techniques and Applications, Melbourne, Australia, Jan. 21-22, 2002.

M. Roach, J. Mason, L-Q Xu, and F.W.M. Stentiford, "Recent trends, in video analysis: a taxonomy of vido classification problems," 6th IASTED Int. Conf. on Intenet and Multimedia Systems and Applications, Hawaii, Aug. 12-14, 2002, p. 348-353.

A. P. Bradley and F.W.M. Stentiford, "Visual attention for region of interest coding in JPEG 2000," Journal of Visual Communication and Image Representation, vol. 14, pp. 232-250, 2003.

F.W.M. Stentiford, "An attention based similarity measure with application to content based information retrieval," in Storage and Retrieval for Media Databases 2003, M.M. Yeung, R.W. Lienhart, C-S Li, Editors, Proc SPIE vol. 5021, Jan. 20-24, Santa Clara, 2003.

Almansa, A., and Desolneux, A., "Vanishing Point Detection with any a priori information," IEEE Trans. on Pattern Analysis and Machine Intelligence, vol. 25, No. 4, pp. 502-506, Apr. 2003.

F.W.M. Stentiford, "An Attention based similarity measure for fingerprint retrieval," Proc. 4th European Workshop on Image Analysis for Multimedia Interactive Services, pp. 27-30, London, Apr. 9-11, 2003.

Okabe, T. et al., "Object Recognition based on Photometric Alignment using Ransac," Proceedings 2003 IEEE Cnferen e on Computer Vision and Pattern Recognition, CVPR 2003, vol. 2, pp. 221-228, Jun. 19-20, 2003.

F.W.M. Stentiford, "The measurement of the salience of targets and distractors through competitive novelty," 26th European Conference on Visual perception, Paris, Sep. 1-5, 2003 (Poster).

O. Oyekoya and F. W. M. Stentiford, "Exploring human eye behavior using a model of visual attention," International Conference on Pattern Recognition 2004, Cambridge, Aug. 23-26, 2004, pp. 945-948.

F.W.M. Stentiford, "A visual attention estimator applied to image subject enhancement and colour and grey level compression," International Conference on Pattern Recognition 2004, Cambridge, Aug. 23-26, 2004, pp. 638-641.

Rasmussen, C., "Texture-based vanishing point voting for road shape estimation," British Machine Vision Conference, Kingston, UK, Sep. 2004. http://www.bmva.ac.uk/bmvc/2004/papers/paper_261.pdf.

Finlayson, G. et al., "Illuminant and Device Invariant Colour using histogram Equalisation," Pattern Recognition, vol. 38, No. 2 Feb. 9, 2005), pp. 179-190.

F. W. M. Stentiford, "Attention based facial symmetry detection," International Conference on Advances in Pattern Recognition, Bath, UK, Aug. 22-25, 2005.

F. W. M. Stentiford, "Attention based symmetry detection in colour images," IEEE International Workshop on Multimedia Signal Processing, Shanghai, China, Oct. 30-Nov. 2, 2005.

Stentiford et al., "An Evolutionary Approach to the Concept of Randomness," The Computer Journal, pp. 148-151, Mar. 1972.

International Search Report mailed Jun. 24, 2003 in PCT/GB03/01211.

International Search Report mailed Apr. 2, 2002 in PCT/SG 01/00112.

European Search Report dated Jan. 8, 2003 for RS 108248 GB.
European Search Report dated Jan. 9, 2003 for RS 108249 GB.
European Search Report dated Jan. 8, 2003 for RS 108250 GB.
European Search Report dated Jan. 9, 2003 for RS 108251 GB.
International Search Report mailed Feb. 9, 2006 in PCT/GB2005/003339.

Chang et al., "Fast Algorithm for Point Pattern Matching: Invariant to Translations, Rotations and Scale Changes," Pattern Recognition, vol. 30, No. 2, Feb. 1997, pp. 311-320.

English-language translation of Japanese Search Report dated Feb. 26, 2008 in JP 2003-579167.

U.S. Appl. No. 10/506,181, filed Aug. 31, 2004, Stentiford.
U.S. Appl. No. 10/507,598, filed Sep. 14, 2004, Stentiford.
U.S. Appl. No. 10/537,540, filed Jun. 3, 2005, Stentiford.
U.S. Appl. No. 10/581,027, filed May 30, 2006, Stentiford.
U.S. Appl. No. 11/661,984, filed Mar. 6, 2007, Stentiford.
U.S. Appl. No. 11/916,475, filed Dec. 4, 2007, Stentiford.
U.S. Appl. No. 11/988,874, filed Jan. 16, 2008, Stentiford.

International Search Report mailed Sep. 4, 2006 in PCT/GB2006/002444.

International Search Report mailed Sep. 11, 2006 in PCT/GB2006/002001.

Geusebroek et al., "Robust autofocusing in microscopy," *Cytometry*, vol. 39. No. 1, Feb. 2000, pp. 1-9, XP002379688.

Geusebroek et al., "Robust autofocusing in microscopy", *Cytometry*, vol. 39. No. 1, Feb. 2000, pp. 1-9, XP002379688.

International Search Report for PCT/GB2006/004602 mailed Feb. 28, 2007.

International Search Report Mailed Mar. 9, 2007 in International Application No. PCT/GB2006/004602.

Geusebroek et al., "Robust Autofocusing in Microscopy," *Cytometry*, vol. 39, No. 1, Feb. 1, 2000, pp. 1-9.

Office Action mailed Feb. 15, 2010 in European Application No. 06 820 470.0 (3 pages).

Response filed Dec. 9, 2010 in European Application No. 06 820 470.0 (3 pages).

* cited by examiner

METHOD FOR FOCUS CONTROL

This application is the U.S. national phase of International Application No. PCT/GB2006/004602 filed 8 Dec. 2006 which designated the U.S. and claims priority to European Patent Application No. 05257796.2 filed 19 Dec. 2005, the entire contents of each of which are hereby incorporated by reference.

BACKGROUND AND SUMMARY

This invention is concerned with focus control and finds application in cameras, or indeed any optical device where the focus of an image needs to be adjusted.

Traditionally there are two approaches to auto-focus: Active (bouncing infra-red from the scene to calculate a distance) and passive (which maximises the intensity difference between adjacent pixels). One example of the second category is described by Geusebrock et al. "Robust autofocusing in microscopy", Cytometry, vol 39, No. 1 (1 Feb. 2000), pp. 1-9. Here, a 'focus score' is obtained for images taken at different focus settings, and best focus is found by searching for the optimum in the focus curve. Both of these approaches have problems, including when the active beam is obscured by fog or mist, where cameras only focus at the centre of the frame, when there's low contrast across the image, or when the subject matter is horizontally oriented.

In application EP1286539A it was described a method of focusing in which a decision as to which part of an image to focus upon (i.e. the subject) is taken by analysing the image to obtain for each picture element a score indicating the degree of dissimilarity of the element and its environment from the remainder of the image: the subject is that part of the image having a high score (i.e. high degree of dissimilarity). The method of generating the score is discussed in greater detail in U.S. Pat. No. 6,934,415.

DETAILED DESCRIPTION OF THE PREFERRED EMBODIMENTS

Some embodiments of the invention will now be described, by way of example, with reference to the accompanying drawings.

Figure 1:
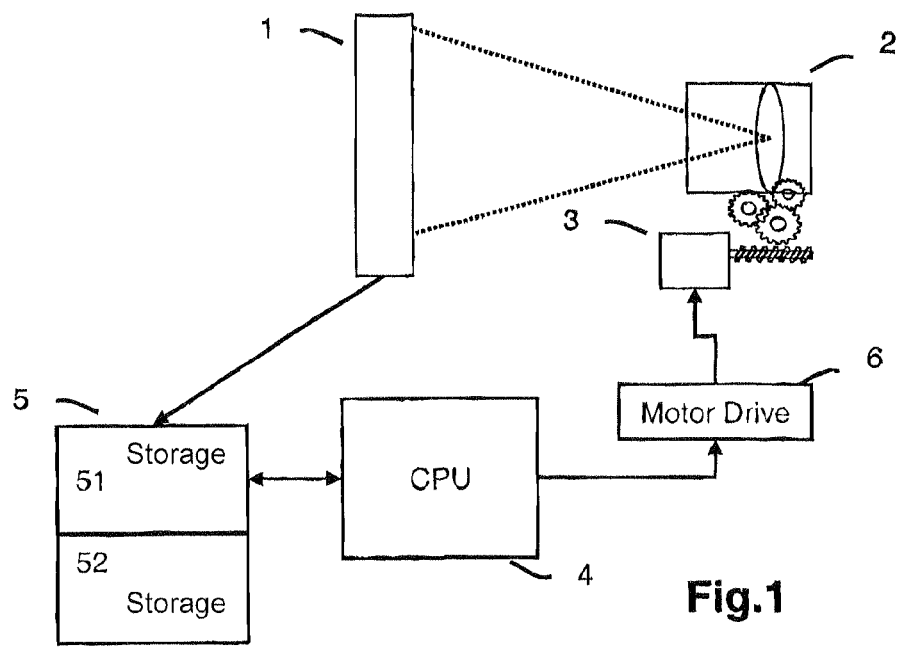
FIG. 1 is a block diagram of a camera in accordance with one embodiment of the invention.

In FIG. 1, a digital still camera has an image pickup device 1, and a lens 2 for focusing an image of a scene upon the pickup device. Adjustment of the lens position and hence focus is performed by a motor 3. These parts are present in a conventional digital camera, of course. Apart from the focus adjustment arrangements now to be described, other parts of the camera such as exposure control, flash, and image storage are conventional and therefore not shown.

Focus control is performed by a control unit, in the form of a suitable program-controlled processor 4, which has access to a store 5 with storage areas 51 for buffering digital images captured by the pickup device 1 and a storage area 52 for a control program. It is also able to control the focussing motor 3 via a drive interface 6.

Figure 2:
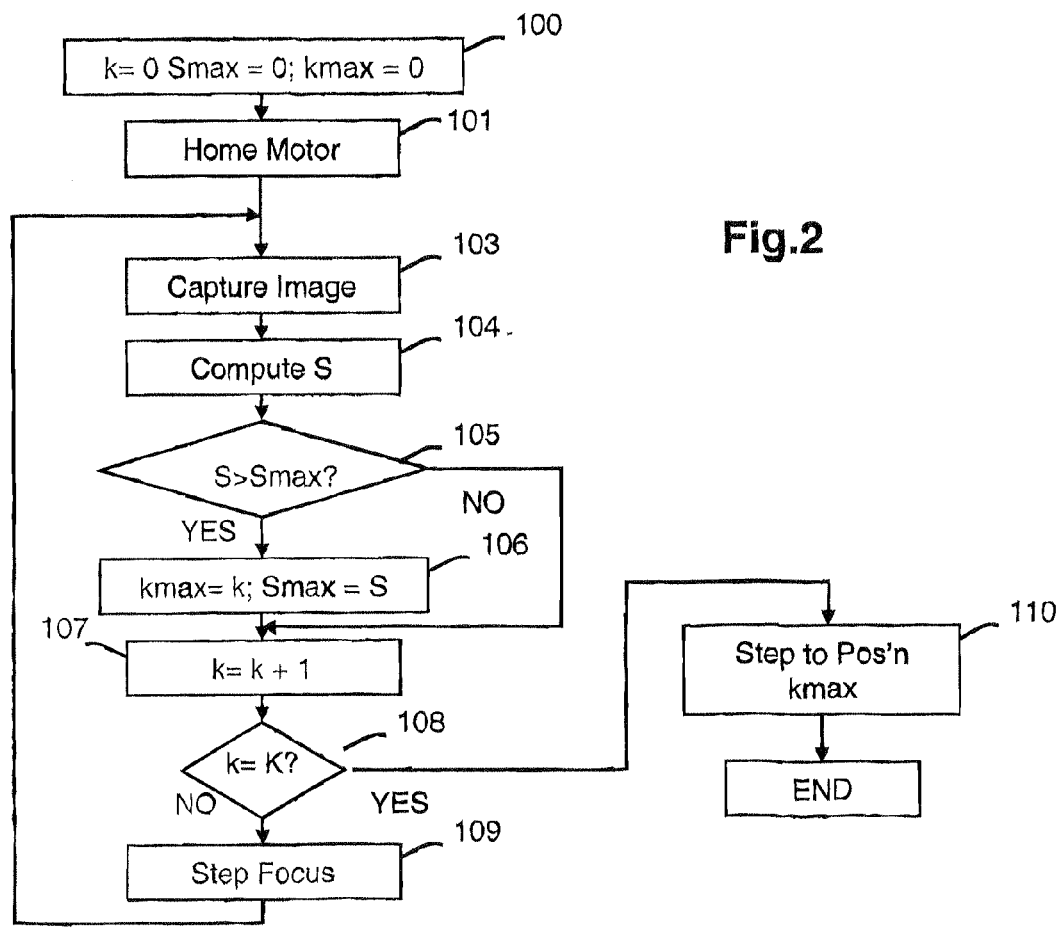
FIG. 2 is a flowchart illustrating the operation of the camera.

The operation of the control program in setting the focus is focussing is shown in the flowchart of FIG. 2. At Step 100, a counter k is initialized to zero, as are a running maximum score Smax and an index $k_{max}$ corresponding to this maximum score. At step 101 the motor moves the lens to one end of its focusing range (e.g. infinity).

At Step 103 an image from the Image pickup device 1 is loaded into the buffer 51. This image is then subjected at 104 to visual attention analysis to produce a score S. Details of this analysis will be given below.

At Step 105, the score S is tested to see if it exceeds Smax: if so, then at 106 Smax is set to this new maximum value and the index $k_{max}$ is set to the corresponding value of k; otherwise these values are left unaltered.

Then at step 107 the counter k is incremented and at 108 a check is performed as to whether the counter k is below a limit K. If this test returns the answer "yes" the process moves to step 109 where the motor 3 is controlled to move the lens focus setting by one step. If the "home" position of the lens corresponds to focussing on infinity then each step involves moving the lens to a position a little further from the pickup device 1. The process then repeats from Step 103, until the counter k reaches the limit K—that is to say, a number of steps that brings the lens to its "near" focussing position (furthest from the pickup device 1).

When the test at 108 returns "yes", this means that all K focus positions have been tested, the maximum score is held in Smax and, more particularly the index $k_{max}$ indicated the number of steps from "home" at which this maximum score—which is deemed to correspond to the optimum focus setting—was found. All that remains, therefore is (Step 110) to move the lens to this position—either directly or by returning the lens to the "home position and then issuing $k_{max}$ step commands to the motor.

One the focus has been set, a photograph may then be taken in the usual way. Alternatively, if desired, (for a digital still image) if one retains all the trial images captured at step 103 in the buffer 5, one could then simply select the image from the buffer that corresponds to the index $k_{max}$.

The above example showed the invention in use in a still, digital camera; naturally it could also be applied to a video camera that captures moving pictures. It could be applied to a camera that takes photographs on conventional film, or any optical device that focuses a real image: In those cases of course the pickup device would be additional to the existing camera.

Turning now to the analysis at Step 104 that generates the score S, this is similar to the process described in U.S. Pat. No. 6,934,415, which analyses an image to generate for each pixel x a visual attention measure $C_x$. Here however it is required only one measure S for the whole image, which can be obtained simply by taking the sum of all the measures $C_x$ for the individual pixels.

If it is desired to focus preferentially on the centre (or any other defined area) of the image, then S could be the sum of measures in respect of just those pixels that lie within the central (or other) area. If preferred, in the interests of speeding up processing, the score could be generated not for every pixel in the image (or area under consideration) but for a subset of those pixels, subsampled on a regular grid, or at random.

The method of generating S will now be described in detail with reference to the flowchart of FIG. 3. This is in principle the same as that described in application EP 1286539A, but in this case it is unnecessary to compute each $C_x$ separately, it is sufficient to increment a single score S for the whole image.

The image stored in the buffer 51 is arranged as an array A of pixels x where each pixel has colour intensities ($r_x$, $g_x$, $b_x$) attributed to it. Initially the score S is set to zero (Step 201).

A pixel $x_0$ is then selected from the array A (Step 202), and its intensity value ($r_x$, $g_x$, $b_x$) is stored in a test pixel register. A count of the number of pixel comparisons $I_x$ (stored in a comparison counter) is set to zero (step 203).

The next step (205) is the random selection of a number of points in the vicinity of the test pixel $x_0$. This region is defined by a distance measure $u_x$ (typically in units of pixels). Thus, n pixels $x_j$ are selected such that $$\text{dist}(x_j - x_{j-1}) < u_x$$

where j=1, ..., n and $x_0$=x.

The distance used may be any of those conventionally used, such as the Euclidean distance or the "city block distance between the positions within the image of the two pixels. If the horizontal and vertical coordinates of $x_j$ are $p(x_j)$ and $q(x_j)$ then the Euclidean distance is $$\sqrt{[p(x_j)-p(x_{j-1})]^2 + [q(x_j)-q(x_{j-1})]^2}$$

whilst the city block distance is $$|p(x_j)-p(x_{j-1})| + |q(x_j)-q(x_{j-1})|$$

Typically n=3, and $u_x$=1. For $u_x$=1, the pixels are contiguous, but, in general the pixels may not necessarily neighbour one another or be contiguous in any sense.

A pixel $y_0$ is now selected randomly (step 206) from the array A to be the current comparison pixel whose Identity is stored in a comparison pixel register.

The value of $I_x$ stored in the comparison counter is incremented (step 207): if a limit L is exceeded, no further comparisons for the test pixel x are made: either another pixel is selected (Step 208) and processed from Step 203, or if all (or sufficient) pixels have been dealt with, the process terminates.

Assuming that L has not yet been exceeded, the contents of the neighbour group definition register are then used to define a set of pixels forming a test group $x_j$ and a set of pixels forming a comparison group $y_j$, each pixel $y_j$ of the comparison group having the same positional relationship to the comparison pixel y as the corresponding pixel $x_j$ in the test group has to the test pixel x (Step 209).

The calculation processor then compares each of the pixels $x_j$ with the corresponding pixel $y_j$, using a set of threshold values $\Delta r_x$, $\Delta g_x$ and $\Delta b_x$.

A pixel y is identified as being similar to a test pixel x if:

$$|r_y - r_x| < \Delta r_x \text{ and}$$

$$|g_y - g_x| < \Delta g_x \text{ and}$$

$$|b_y - b_x| < \Delta b_x.$$

where $\Delta r_x$, $\Delta g_x$ and $\Delta b_x$ are threshold values which are, in this embodiment, fixed.

If all the pixels $X_j$ in the test group are similar to their corresponding pixels $V_1$—in the comparison group, the process is repeated by selecting a new set of neighboring pixels (Step 205) and a new comparison pixel $y_0$ (Step 206). If one, or more pixels $X_j$ in the test group are not similar to the corresponding pixel y, in the comparison group, in accordance with the similarity definition above, the score S stored in the anomaly count register is incremented (Step 210). Another comparison pixel $y_0$ is randomly selected and stored in the comparison pixel register (return to Step 206) and the neighbor group definition retrieved from the neighbor group definition store is used to supply a new comparison neighbor group to the comparison group register for comparison with the test group stored in the test group register. A set of pixels $X_j$ is retained in the test group register so long as it continues to fail to match other parts of the image. Such a set represents a distinguishing feature of the locality of x—the more failures to match that occur, the more distinctive it is. The more comparison pixels y that the test pixel x fails to provide matches for, the higher the score S becomes.

When the process has finished, the final value of S is the measure of visual attention for the image Al x, and is the number of attempts (from a total of number of attempts equal to L multiplied by the number of pixels considered) for which the inherent characteristics (i.e. the colors) of randomly selected neighbors of pixel x failed to match the corresponding neighbors of randomly selected pixels y. A high value indicates a high degree of mismatch for pixels of the image with the rest of the image.

As noted above, the process may be repeated, from step 203, for every pixel in the image as the test pixel, so that the value S is in effect the sum of scores for every pixel x in the array A. Typically, L may be set to be 100.

As described above, comparisons are performed for the neighboring pixels $X_j$, yj, j=i, ... n; however, if desired, the original or root pixels may also be included, the comparisons being performed for j=0, ..., n.

Figure 3:
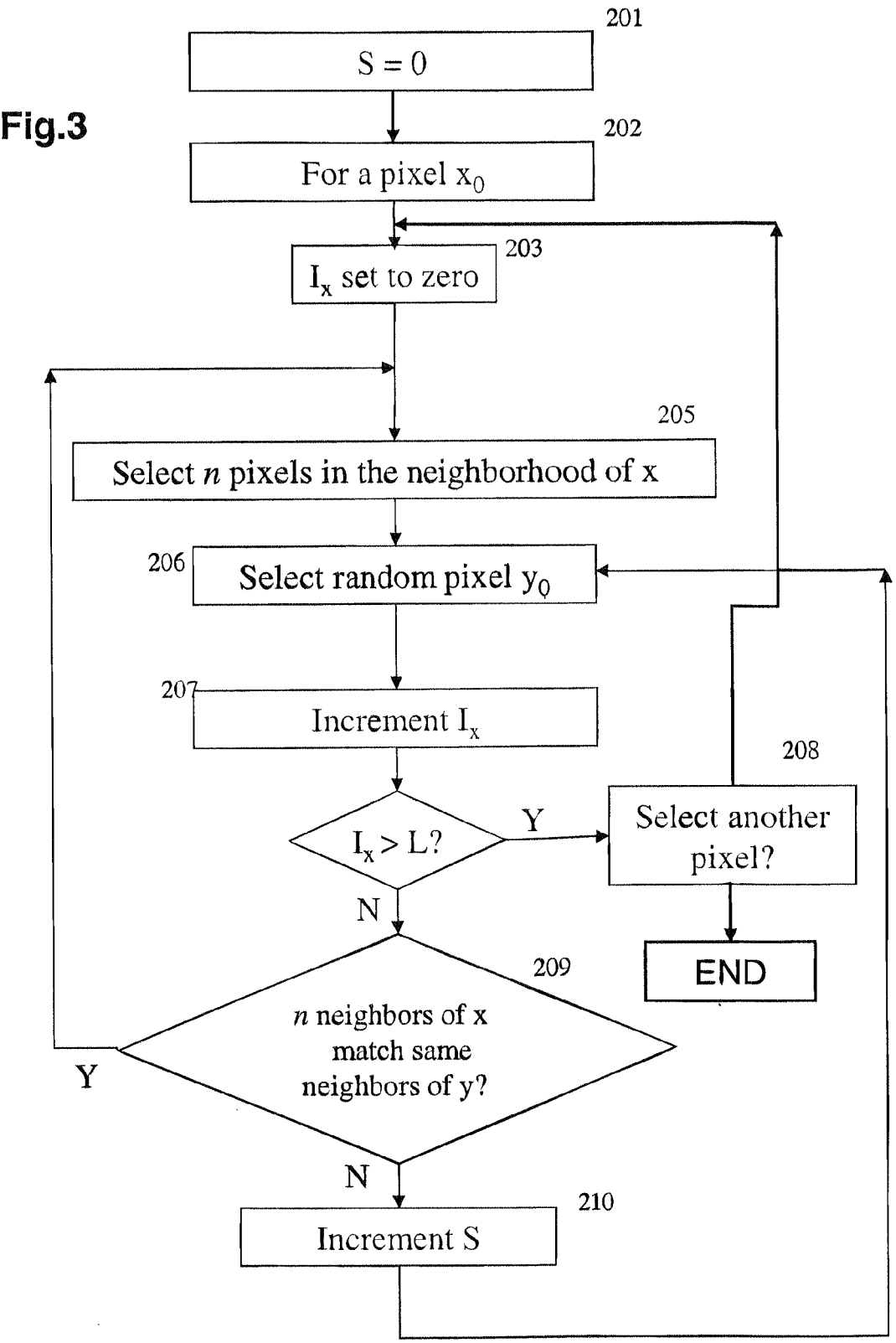
FIG. 3 is a flowchart illustrating the calculation of the score for each image.

Note too that, whilst preferred, it is not essential that the analysis loop of FIG. 3 terminals (at 209) upon a single match. For variation, see our aforementioned US patent.

Note that where subsampling is used as discussed above, only a subset of pixels are chosen as pixels x; however it is preferable that the neighboring pixels are chosen from the full image

EXPERIMENTAL RESULTS

Figure 4:
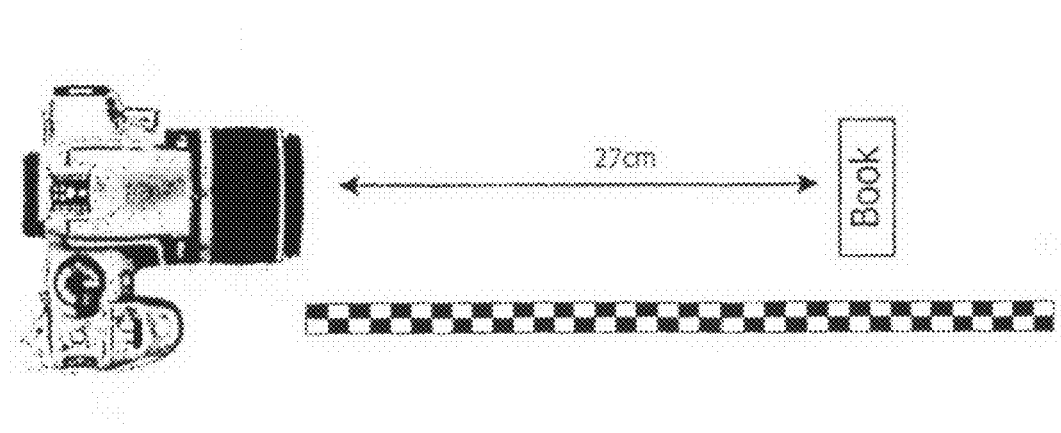
FIG. 4 illustrates an experimental setup for a camera system according with one embodiment of the invention.
Figure 5:
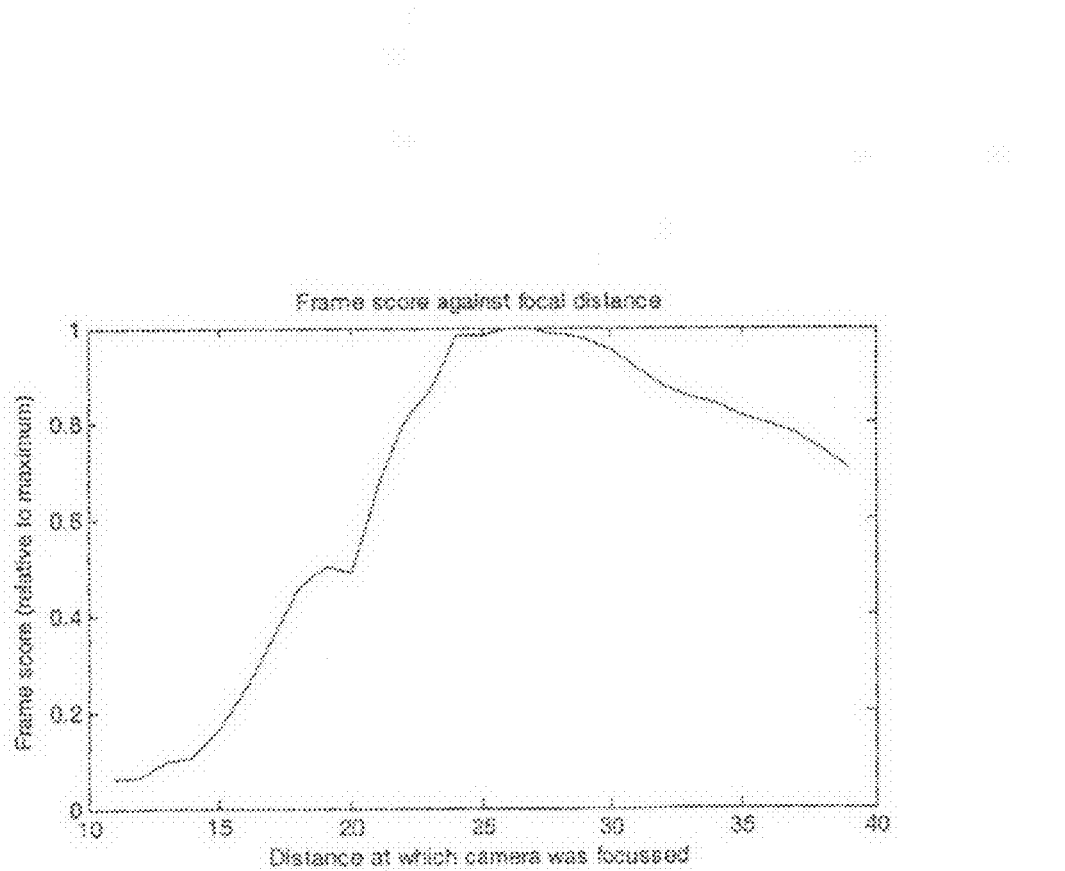
FIG. 5 illustrates an experimental frame score vs. focusing distance curve.

A Canon EOS 300D camera was used to photograph the same scene whilst focusing at different distances, from 11 cm to 39 cm, as shown In FIG. 4. A small F-stop (large aperture) was used to minimise the depth of field. All photos were taken as 1.5 mega-pixel JPEGs, converted to BMP, and then resealed to be 200×266 pixels in size. They were then processed by the VA algorithm, with a view radius of 10, fork radius $u_x$ of 5, 10 pixels per fork, no skipping, 10 tests and a colour threshold of 50. The overall frame score was then plotted graphically, as shown in FIG. 5. This shows a clear peak at exactly the frame corresponding to the distance at which the book had been placed.

Thus we see that, by computing a total VA scores for the entire image a measure of overall interest can be found. In turn, if the total score is compared against multiple candidate images, it can be used to help decide which is most interesting, and possibly best if used to control a camera's auto-focus.

However, by computing the global interest level within each frame, then slightly changing the focus, it's possible for the camera to quickly lock onto the focus distance at which the frame is most interesting. Indeed, this could be used to determine the depth of field of the image, by seeing how much the focus can be changed without a significant drop in overall score.

There are a huge number of other applications—anywhere where there are parameters that need changing to optimize an output image could potentially benefit from VA being used to automatically choose the best values.

The invention claimed is:

1. A method of focusing an optical system, comprising:
   (a) generating a plurality of digital images each obtained with a different focus setting of the optical system within a desired focusing range;
   (b) analyzing the digital images to generate for each image a score by comparing first groups of pixels chosen from the image and having randomly chosen positional relationships with respect to one another with randomly positioned second groups chosen from the same image such that the pixels of each second group have the same respective positional relationships with respect to one another as the pixels of the first group with which it is compared have to one another, the score associated with each image being a function of the number of mismatches obtained with said comparisons; and
   choosing that focus setting that corresponds to the image having a score indicative of the largest number of mismatches relative to the other images.

2. A method according to claim 1, in which each score is generated by:
   storing each image as an array of pixels, each pixel having a value;
   selecting test pixels from the array, for each test pixel, selecting one or more neighbor groups of pixels neighboring the test pixel, wherein each neighbor group comprises a number of pixels of the array in the vicinity of the test pixel;
   selecting comparison pixels from the array;
   selecting a group of pixels neighboring a selected comparison pixel, said group of pixels having the same respective positional relationships to the comparison pixel as a selected neighbor group of pixels has to the test pixel; and
   comparing the values of the selected neighbor group of the test pixel with the values of the selected neighbor group of the comparison pixel in accordance with a predetermined match criterion, and
   generating the score for the image, in dependence upon the number of comparisons for which the comparison results in a mismatch.

* * * * *